(12) United States Patent
Ranganathan (10) Patent No.: US 7,684,627 B2
(45) Date of Patent: Mar. 23, 2010

(54) TECHNIQUES FOR IMAGE DECOMPRESSION

(75) Inventor: Sridharan Ranganathan, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 1221 days.

(21) Appl. No.: 10/954,647

(22) Filed: Sep. 29, 2004

(65) Prior Publication Data

US 2006/0072839 A1 Apr. 6, 2006

(51) Int. Cl.
*G60K 9/36* (2006.01)
*G06K 9/46* (2006.01)

(52) U.S. Cl. .................. 382/233; 382/234
(58) Field of Classification Search .............. 382/233, 382/243; 708/203
See application file for complete search history.

(56) References Cited

U.S. PATENT DOCUMENTS

| | | | | |
|---|---|---|---|---|
| 4,862,167 A | * | 8/1989 | Copeland, III | 341/107 |
| 5,297,220 A | * | 3/1994 | Nomizu | 382/247 |
| 5,309,381 A | * | 5/1994 | Fukui | 708/203 |
| 5,313,203 A | * | 5/1994 | Suu et al. | 341/50 |
| 5,471,206 A | * | 11/1995 | Allen et al. | 341/51 |
| 5,583,500 A | * | 12/1996 | Allen et al. | 341/107 |
| 5,710,562 A | * | 1/1998 | Gormish et al. | 341/107 |
| 5,717,394 A | * | 2/1998 | Schwartz et al. | 341/51 |
| 5,781,136 A | * | 7/1998 | Imanaka et al. | 341/107 |
| 5,809,176 A | * | 9/1998 | Yajima | 382/247 |
| 6,055,338 A | * | 4/2000 | Endo et al. | 382/247 |
| 6,094,151 A | * | 7/2000 | Schwartz et al. | 341/107 |
| 6,351,569 B1 | * | 2/2002 | Kimura et al. | 382/247 |
| 6,882,751 B2 | * | 4/2005 | Kambegawa | 382/247 |
| 7,095,344 B2 | * | 8/2006 | Sekiguchi et al. | 341/107 |
| 7,286,710 B2 | * | 10/2007 | Marpe et al. | 382/239 |
| 2005/0179572 A1 | * | 8/2005 | Winger | 341/107 |

OTHER PUBLICATIONS

Tarui, M.; Oshita, M.; Onoye, T.; Shirakawa, I., "High-speed implementation of JBIG arithmetic coder", TENCON 99. Proceedings of the IEEE Region 10 Conference, vol. 2, Sep. 15-17, 1999 pp. 1291-1294 vol. 2.*

Tompkins, Dave , et al., "Coding of Still Pictures, Additional Extension Segments for JBIG2", *ISO/IEC JTC 1/SC 29/WG1 N1318*, Jul. 1999 Meeting—Vancouver, (Jul. 6, 1999), 5 pgs.

* cited by examiner

*Primary Examiner*—Samir A. Ahmed
*Assistant Examiner*—Li Liu
(74) *Attorney, Agent, or Firm*—Schwegman, Lundberg & Woessner, P.A.

(57) ABSTRACT

Techniques are provided for image decompression. Compressed pixels are pipelined through various decompression processes. As contexts for some pixels are resolved, the resolved contexts are fed back into selective portions of the decompression processes in order to resolve contexts for other pixels currently being processed.

24 Claims, 6 Drawing Sheets

TECHNIQUES FOR IMAGE DECOMPRESSION

BACKGROUND INFORMATION

Context-adaptive arithmetic coding is a technique for entropy coding of bi-tonal images as evinced by a variety of current industry standards (e.g., Joint Bi-level Image Experts Group (JBIG, JBIG2), etc.). Essentially, pixels of an image are compressed into a series of bits that have a unique pattern. A compression algorithm maps a sequence of symbols embedded in the image being compressed into a real number interval. The compression algorithm successively divides the interval into sub-intervals based on inputted symbols parsed from the image and their associated probabilities (likelihoods that a parsed symbol is matched with a known symbol). The performance of the compression algorithm is in direct proportion to how well it does with estimating the symbol probabilities, because as symbols become known the compression algorithm adjusts itself if the estimations were incorrect.

A model is used by a compression algorithm to estimate symbol probabilities for input symbols based on contexts associated with the input symbols. The model maintains a state file for each context of each input symbol, and the model is updated as symbols are received and processed.

Decompression proceeds in a similar manner as compression. That is, compressed pixels represented as a series of bit values are acquired and their contexts are resolved. Based on contexts, a most likely symbol is determined and that most likely symbol is outputted as a portion of the decompressed image. Again, if the decompression algorithm does not estimate the symbols or pattern correctly, then the performance of decompression degrades as the decompression algorithm adjusts itself.

Because arithmetic decompression is heavily dependent on the contexts of previously processed compressed values and contexts of values that may have not yet been processed, the decompression performance becomes restricted. Thus, portions of the decoding remain idle until enough information becomes available to predict a context. Stated another way, sequential dependencies which are inherent in a binary compressed image restrict processing throughput of existing implementations of decompression algorithms to a tightly coupled process that linearly progresses.

DESCRIPTION OF THE EMBODIMENTS

Figure 1:
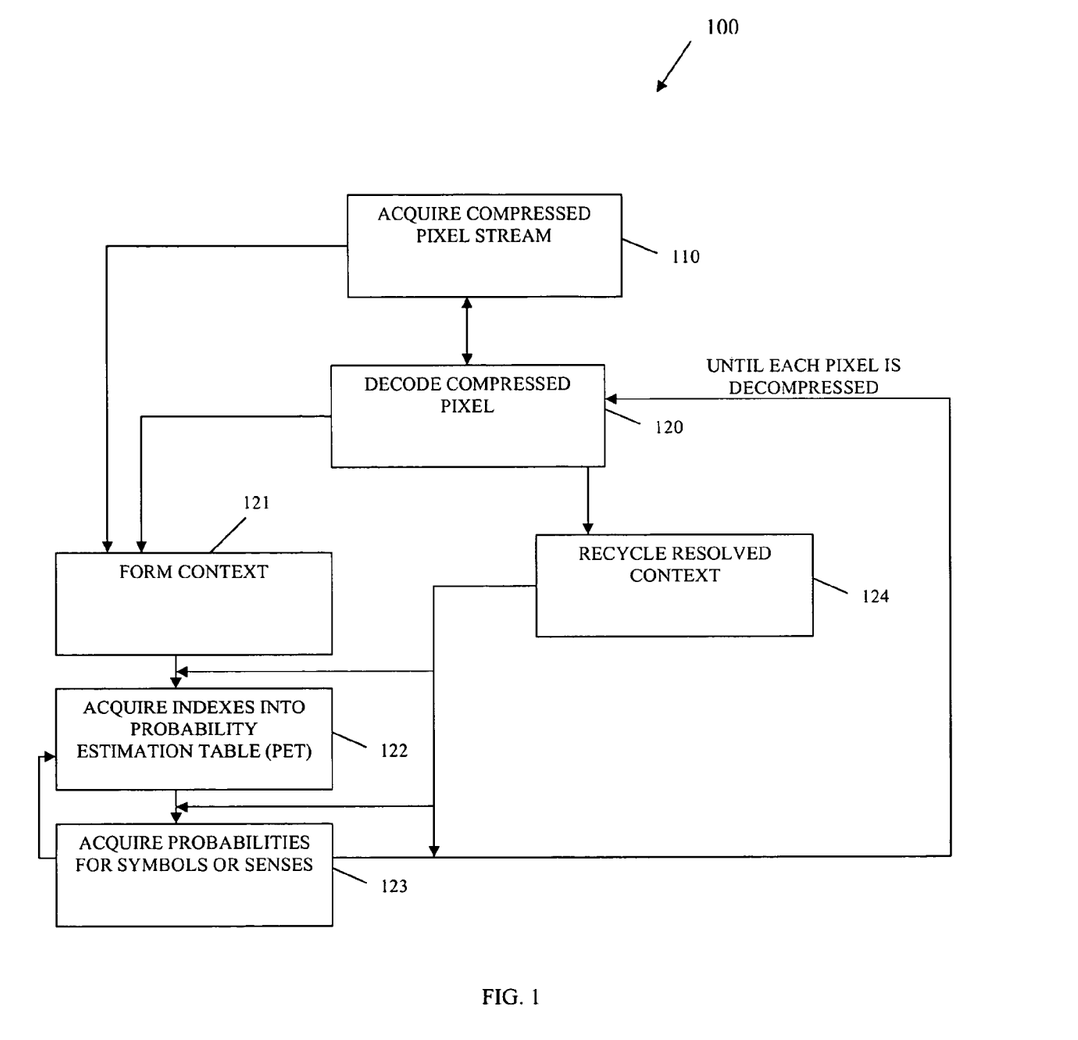
FIG. 1 is a flowchart of a method for decompressing compressed pixels of an image, according to an example embodiment.

FIG. 1 illustrates a flowchart of one method 100 for decompressing pixels of a compressed image, according to an example embodiment. The method 100 is implemented in a machine accessible medium and/or machine. However, the method 100 may be implemented in many manners, such as, and by way of example only, the method 100 may be implemented as a series of signals, as a part of a hardware implementation, combinations of hardware and/software, etc. In an embodiment, the method 100 is implemented as microcode loaded and processed within a parallel processor's architecture, such as Intel's® MXP Digital Media Processor. In another embodiment, the method 100 is implemented within a hardware accelerator of a microprocessor's architecture. Of course, the method 100 may be implemented in a variety of machines, media, and/or architectures.

As used herein an "image" may be considered a logical grouping of one or more pixels. Thus, an image may be segmented in any configurable manner into a series of blocks, swaths, or portions, such that each block, swath, or portion is itself an image. In this manner, any logical segmentation of pixels can combine with other segmentations to form a single or same image. Conversely, a single segmentation may be viewed as a single image.

A pixel may be bi-tonal which means that it is represented as a single bit of information (0 or 1). Additionally, a single pixel may be represented as a series of bits, such as words of varying and configurable lengths (e.g., 8, 16, 32, 64, 128, etc.). The pixels may also be nibbles, such as 4 bits, etc. For purposes of various embodiments presented herein, if a pixel is represented as a word, then each bit of that word may be treated and processed in a bi-tonal manner. For example, if a pixel includes 8 bits of information to represent a plurality of potential colors, then each bit of the pixel can be individually processed in the manners discussed herein and below as a single binary decision of 0 or 1. Additionally, if pixels are processed in lengths greater than 1 bit, then processing may be done in a planar fashion. For example, bit 1 in each pixel instances may be treated as image 1 and bit N in each pixel instances may be treated as image N.

The term "piping" or "pipelining" is commonly used and understood in the programming arts and refers to the ability to transmit data as it is received or produced without the need to buffer the data until some particular processing completes or until some configurable amount of data is accumulated. For example, suppose a particular set of data (D) is processed by a first algorithm A1. A1 produces another set of data (D') from D. D' is processed by another algorithm A2. In this example, D is sent to A1 as soon as A1 produces any portion of D'; that portion is immediately transmitted to A2 for processing. With piping techniques, A2 does not have to wait to begin processing until the entire set of D' is produced from A1; rather, A2 initiates processing as soon as A1 produces any portion of D'. Moreover, the data may be instructions processed by a machine. For example, an instruction (data) within a machine may be in a fetch stage, decode stage, or execute stage; and the final result in a write-back stage. While one instruction is moved into a decode stage, the next instruction can move into the fetch stage. Thus, as a first instruction (data) moves through the rest of the instruction stages, the subsequent instructions (data) also get pulled through.

An arithmetic decoder is any existing or custom-developed algorithm that performs image decompression against a binary compressed image. Arithmetic decoders are readily known and available in the industry. Any of these decoders or custom-developed decoders, which are modified such that their output and input are interfaced with the processing described herein, are intended to be included within the various embodiments presented with this invention. The decoder progresses through an image by recognizing patterns and speculating on what future patterns may be prior to actually processing some compressed pixels from the compressed image. Once pixels' contexts, which were speculated on become known, the decoder updates itself as necessary to account for what the actual decompressed values for those pixels should be.

In various embodiments, the arithmetic decoder is context-adaptive. This means that the decoder adapts for context as contexts for the pixels become known during decompression. Decompression is driven by contexts associated with the pixels being decompressed.

Initially, at 110, a compressed pixel stream represented as bit values is acquired. Acquisition may be achieved via any buffer or buffering service that sequentially parses a compressed image (e.g., in raster order). At 120, the compressed pixels are decoded, after contexts and probabilities are resolved as discussed further herein and below. Additionally, once a particular pixel is decoded that information is used to form contexts for other pixels that are not yet decoded. For the first pixel any initial context for that first pixel may be assumed for purposes of processing. For subsequent processing (after the initial pixel), the method 100 progresses in the following manner.

A decoded pixel, which is initially decoded by a decoding algorithm, is piped to a process that forms its context as additional pixels are received, at 121. The context forming process outputs a context for the decoded pixel. The context may be formed based on a variety of information, such as, but not limited to, environmental variables and other decoded decisions (decoded pixels) produced by 120.

The probable context is then piped from 121 to a context state index process, at 122. The context state index process maintains an entry for each possible context of the pixels. Moreover, each entry includes an index into a probability estimation table (PET) and a sense. The sense stores the most probable symbol for a given context as either a 1 or 0. Thus, the processing, at 121, returns an index into the PET and a sense.

In an embodiment, the PET may be implemented as a hard coded state machine that contains several states with associated probabilities. The probabilities are associated with estimates for current decisions being made. As the process of decoding progresses, state transitions (also known as renormalizations) are made and updated to the context state index process. Thus, at 122, probabilities for symbols of decoded pixels are acquired and the most probable sense (0 or 1) is fed to the decoding algorithm, at 120. Next, the decoding algorithm in response to the most probable sense selects a symbol from a symbol library to represent the decompressed pixel.

As contexts and decisions are resolved for decoded pixels; the resolved contexts are recycled, at 124, back to the processing at 122 and 123. Thus, the processing at 121, 122, and 123 all concurrently process different decoded pixels received from the decoding process, at 120. Typically, the processing at 122 and 123 would be idle until enough context of a current pixel being processed by 121 is known in order to resolve the index into the PET and the probability for the symbol. However, this is not the case with embodiments of this invention, because the decoding process continues to decode pixels and pipe them to 121, when a decision is known for each of those decoded pixels, at the conclusion of 123, the decisions are immediately piped back to the processing at 122 and 123. In this manner, several pixels may be processed at once and each pixel may be in different stages of the processing. Therefore, no process remains idle and each process is more completely utilized with embodiments presented herein. As a result, the processing of the method 100 improves processing throughput associated with context-adaptive image decompression.

In an embodiment, the method 100 utilizes context formation templates. These context formats may be existing templates used in the industry for binary image compression and decompression. For example, several templates from the Joint Bi-level Image Experts Group (JBIG) exist and may be used with embodiments presented herein. A context template represents a group of pixels in a defined pattern. If the template pattern is matched to a series of decompressed pixels, then it provides a known context for a current pixel being processed. Some example templates from the JBIG2 standards include 16-pixel templates, 13-pixel templates, 3-row 10-pixel templates, and 2-row 10-pixel templates.

As further illustration of the processing associated with the method 100 consider the following scenario. Assume that a JBIG2 context template is associated with a given compressed image. The identity of the template may be included as header information within the compressed image. In the present example, assume also that the JBIG2 template is a 10-pixel template. This means that a current pixel being processed at any point during the processing of the method 100 may have its proper context resolved once 10 prior pixels' contexts are resolved to match a pattern in the 10-pixel template.

Continuing with the present example, at 121, during the first cycle through the method 100 the results of three previous operations (processing of 122, 123, and 124) are not known. That is, 3 pixels or bits are unknown in the template. This is so, because 10 pixels or bits are needed to match to the template in order to resolve a current pixel's context. Therefore, at any point during processing the processes at 121, 122, and 123 will be working to resolve a current pixel's context. Thus, at any point during processing 7 pixels will be resolved and three are not resolved. It should be reiterated that the example is being presented for purposes of illustration only, since in some embodiments, more than three pixels may be unknown. This may occur if the pipelining is done in a different manner or if a machine processing the method 100 consumes more than 3 cycles in the pipe for processed used in resolving prior pixels' contexts.

In the example, one of the three unknown bits (pixels) will be known during the next cycle through the method 100 before 122 processes, since that one bit will be resolved at 124 and recycled back to 122. Thus, in the first cycle, the processing at 121 forwards the known 7 bits to 122 and speculates on the probable contexts for the known 7 bits.

In an embodiment, the processing at 122 is a context state memory that resolves a sense and an index into the PET (depicted by the processing of 123). That context state memory may be segmented and executed in parallel as duplicated or replicated copies in memory. In one example, the context state memory is segmented into four banks in memory, such that the processing at 122 is capable of simultaneously performing four independent lookups within the context state.

During a second cycle through the method 100, the processing at 122 has already received 7 known bits from the processing at 121 during the first cycle and also receives a new decision for a resolved context from the processing at 124. Thus, 8 bits of context are now known. Each lookup within the context state uses the 8 bits of information to select a sense and an index into the PET. Thus, the processing at 122 produces 4 potential PET indexes and senses (possible combinations using the 8 bits) during the second cycle, since 2 bits are unknown.

Again, continuing with the present example, 4 sets of indexes and senses are provided to the processing at 123 at the conclusion of cycle 2. At the start of cycle 3 another decision for a context is supplied via 124 to the processing of 123. In an embodiment, that new decision is multiplexed or used to reduce the 4 sets of indexes and senses down to two sets of indexes and senses. At this point, there are two speculative threads and two possible results or probable contexts for a yet unprocessed decision. Moreover, similar to the context state memory of the processing at 121, the processing at 123 (PET processing) may be replicated in memory to perform two or more multiple simultaneous lookups into the PET. The lookups provide a probability estimate for the associated senses (symbols).

At the start of cycle 4, another decision or context is known and is recycled back to the processing just after 123. Here, in an embodiment, another multiplexer or selection algorithm may be deployed to select between the two available probabilities and Senses, which were produced during cycle 3 by the processing of 123. Selection is made based on a recycled decision recycled or piped back into the processing. The final probability is then used to select a proper value for the symbol (sense) as a 0 or 1, since each sense (symbol) may have two versions or values. The proper version of the symbol is then selected by the decoder at 120 and outputted as a decompressed portion of the original compressed image.

It has been demonstrated that multiple processes some processing in duplicate and some in parallel, may be arranged and interfaced in manners that improve image decompression throughput. This is achieved by pipelining and recycling/re-inputting decisions (contexts) to different portions of the processing of the method 100 and processing each of the processes even when only limited context information is initially available. Thus, the processes are not idle and each process is working efficiently to resolve contexts for the decompression of the image.

Figure 2:
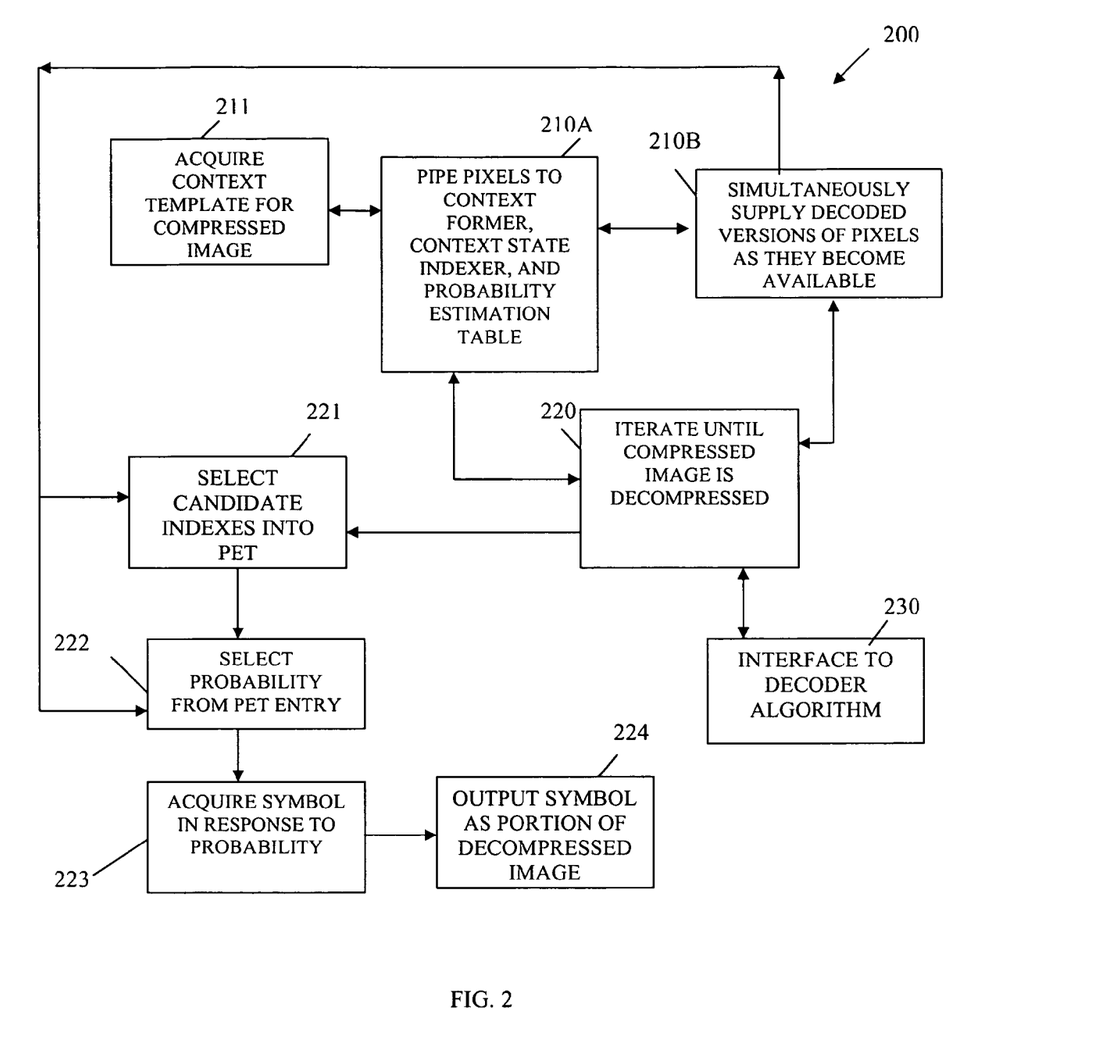
FIG. 2 is a flowchart of another method for decompressing compressed pixels of an image, according to an example embodiment.

FIG. 2 is a flowchart of another method 200 for decompressing compressed pixels of an image, according to an example embodiment. The method 200 may be implemented as signals, software, hardware, and/or combinations of the same. In an embodiment, the method 200 is implemented as a special processor or accelerator within a microchip's architecture having microcode, firmware, and/or software instructions for performing the processing of the method 200 depicted in FIG. 2.

Initially, a compressed image or some desired/configurable portion of the compressed image is acquired and made available for consumption by the processing of the method 200. Acquisition may occur in a variety of manners. For example, another buffering service may be interfaced to the method 200 and may provide configurable chunks of the compressed image to the method 200 when requested.

At 210A the compressed pixels (binary values for bits that represent the compressed pixels in the compressed image) are piped to a context former, a context state indexer, and a probability estimation table. Simultaneous to 210A and at various points during the processing of the method 200, decoded versions of some pixels are resolved, such that context for other pixels that are still be decoded may be resolved. Thus, at 210B, these decoded pixels or their resolved contexts are supplied or piped back into the processing.

In an embodiment, at 211, a context template may be acquired for the compressed image being decompressed. The template permits a decoder to resolve pixel contexts once a configurable number of decompressed pixels and their contexts are resolved and matched to the template. The identity of the template may be acquired from a header associated with the compressed image or may be configured as a parameter or environmental variable associated with the processing of the method 200.

At 220, the processing of the method 200 iterates until the compressed image is decompressed. During a single iteration, a variety of sub-processes execute. These sub-processes may include the context former, the context state indexer, and the probability estimation table (PET). Processing associated with these sub-processes along with a decoder was described in detail above with the processing of the method 100 depicted in FIG. 1.

FIG. 2 depicts some of the operations that the sub-processes may perform during a single iteration of the processing of the method 200. For example, at 221, the context state indexer selects candidate indexes and senses (symbols) into the PET based on potential contexts supplied by a context former. Again, as pixels are decoded, at 210B, the resulting contexts for those decoded pixels may be fed back to the context state indexer in order to whittle the number of candidate indexes and senses. Thus, as 210B progresses the number of candidate indexes and senses produced by 221 are reduced.

In a similar manner, at 222, the sub-process associated with the PET selects candidate probabilities for the PET entries identified by the reduced candidate indexes which are supplied from context state indexer, at 221. As 210B progresses and decodes pixels and their contexts, these decisions are supplied back to the PET, at 222. This permits the PET to reduce the candidate probabilities for candidate senses (symbols) to a single selection of choice.

Accordingly, at 223, a single candidate probability for a single candidate sense is used to acquire the proper symbol in response to the probability. Again, each symbol may have two values one for 0 and one for 1 (binary). Thus, a single sense actually represents two different values for a single symbol. The probability permits the proper selection between the two values for the symbol. Once the correct symbol is known, that symbol is outputted, at 224, as a portion of the decompressed image.

In an embodiment, the processing of the method 200 is interfaced to a decoder algorithm (decoder). That is, the output decisions made to the decoder are intercepted and fed to the method at 210B. In this manner, existing decoders may be integrated and interfaced to the processing of the method 200. On technique to do this is to intercept output decisions of such a decoder and pipelining those decisions back through the processing of the method 200.

In another embodiment, the method 200 processes bi-tonal pixels (represented as single bit values 0 or 1). In still another embodiment, the pixels may be configurable word lengths representing a plurality of bit values. In this latter embodiment, each bit of a multi-bit pixel is processed independently through the processing of the method 100.

Figure 3:
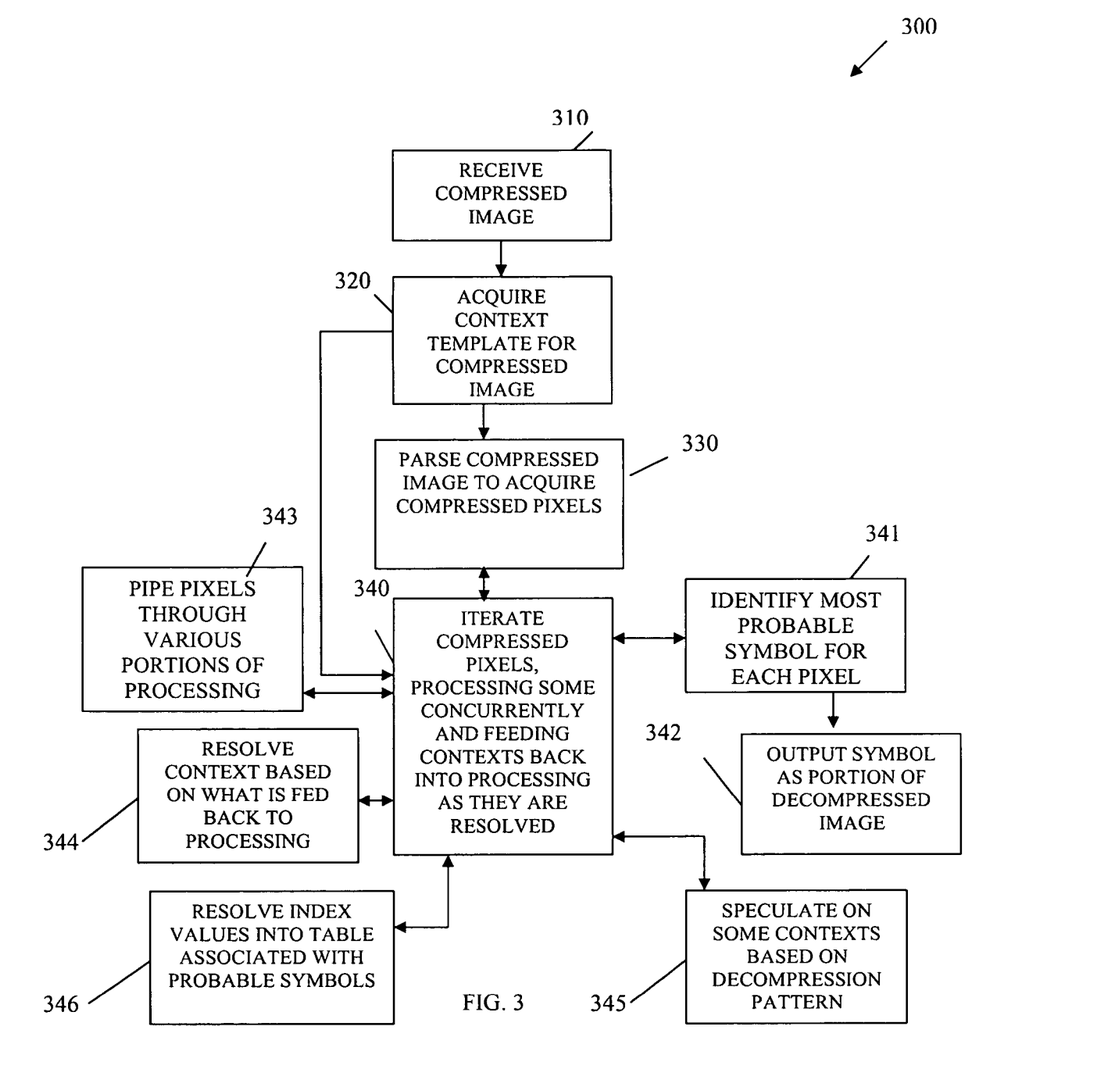
FIG. 3 is a flowchart of still another method for decompressing compressed pixels of an image, according to an example embodiment.

FIG. 3 is a flowchart of still another method 300 for decompressing compressed pixels of an image, according to an example embodiment. The method 300 may be implemented as signals, software, hardware, and/or combinations of the same. In an embodiment, the processing of the method is implemented as instructions within one or more hardware elements of a microprocessor's architecture for purposes of improving the processing throughput associated with image decompression through the machine using the microchip.

At 310, a compressed image is received for decompression. At 320, a context template which assists in resolving contexts for the compressed pixels of the image is acquired. In an embodiment, the identity of the context template is acquired as an initial header embedded within the compressed image.

Alternatively, the identity of the context template may be acquired as a processing parameter or environmental variable associated with the method 300.

At 330, the compressed image is parsed to acquire compressed pixel values. At 340, each compressed pixel is processed through the remainder of the method 300 in the following manners. It is noted that a same pixel may be concurrently and simultaneously processed by different portions of the processing during a single iteration and some different pixels may be processed concurrently and in parallel by different portions of the processing. Also, at the conclusion of a single iteration, at 340, additional pixels are parsed from the compressed image and supplied to the processing.

After a single iteration, a most probable symbol for a pixel is identified, at 341. At 342, the identified symbol is outputted as a portion of the decompressed image. In this manner, the method 300 may serially iterate the compressed image pixel by pixel and generate decompressed versions of each pixel as a symbol. The symbols may be buffered, piped, and/or streamed to memory, storage, other devices, or other applications for subsequent or immediate consumption.

During iterations, at 343, the pixels are piped through various portions of the processing, such that the portions of the processing remain active and are generally not idle during image decompression. Additionally, at 342, during iterations as a particular context for a particular pixel is resolved that resolved context is fed back into the processing for purposes of resolving contexts of other pixels currently being processed.

Correspondingly, at 344, pixel contexts are resolved in response to matches occurring to the context template and in response to resolved contexts that are fed back into the processing. Some portions of the processing may be working on pixel P, while another portion is working on pixel P+1, and still another portion is working on pixel P+2. Thus, as contexts for each of these pixels become known, they are immediate fed back into the appropriate processing so that each of the pixels can have their contexts properly resolved as well.

In an embodiment, at 345, the processing may speculate on contexts of the pixels based on patterns that are emerging. Thus, one portion of the processing may identify two or more potential candidate contexts for a particular pixel being processed based on the pattern of decompression that it was supplied and based on the context template. The candidate contexts can be whittled or reduced once resolved contexts are fed back into the processing. In an embodiment, the processing may not wait for a resolved context; rather it produces candidate contexts which are buffered in an intermediate location and reduced once a resolved context is supplied.

In similar manners and in another embodiment, at 346, the processing may resolve candidate index values from speculative contexts and associated those index values with probable symbols (senses). The indexes are associated with entries in a PET. The PET produces the candidate or speculative probabilities for the candidate contexts and senses. In an embodiment, the PET produces two or more candidate or speculative probabilities for two or more candidate symbols and provides the same to an intermediate buffer or multiplexer. The multiplexer then receives a resolved context used to pick the proper probability and sense when the resolved context is fed back into the processing. Thus, the PET does not idle waiting on the resolved context.

In an embodiment, the processing depicted at 344-346 may be replicated and processed as multiple instances of one another to achieve even more processing throughput during image decompression. In these embodiments, multiplexers may be used after the processing of 344-346 in order to reduce the number of probable context and symbols for iterations of the method 300.

Figure 4:
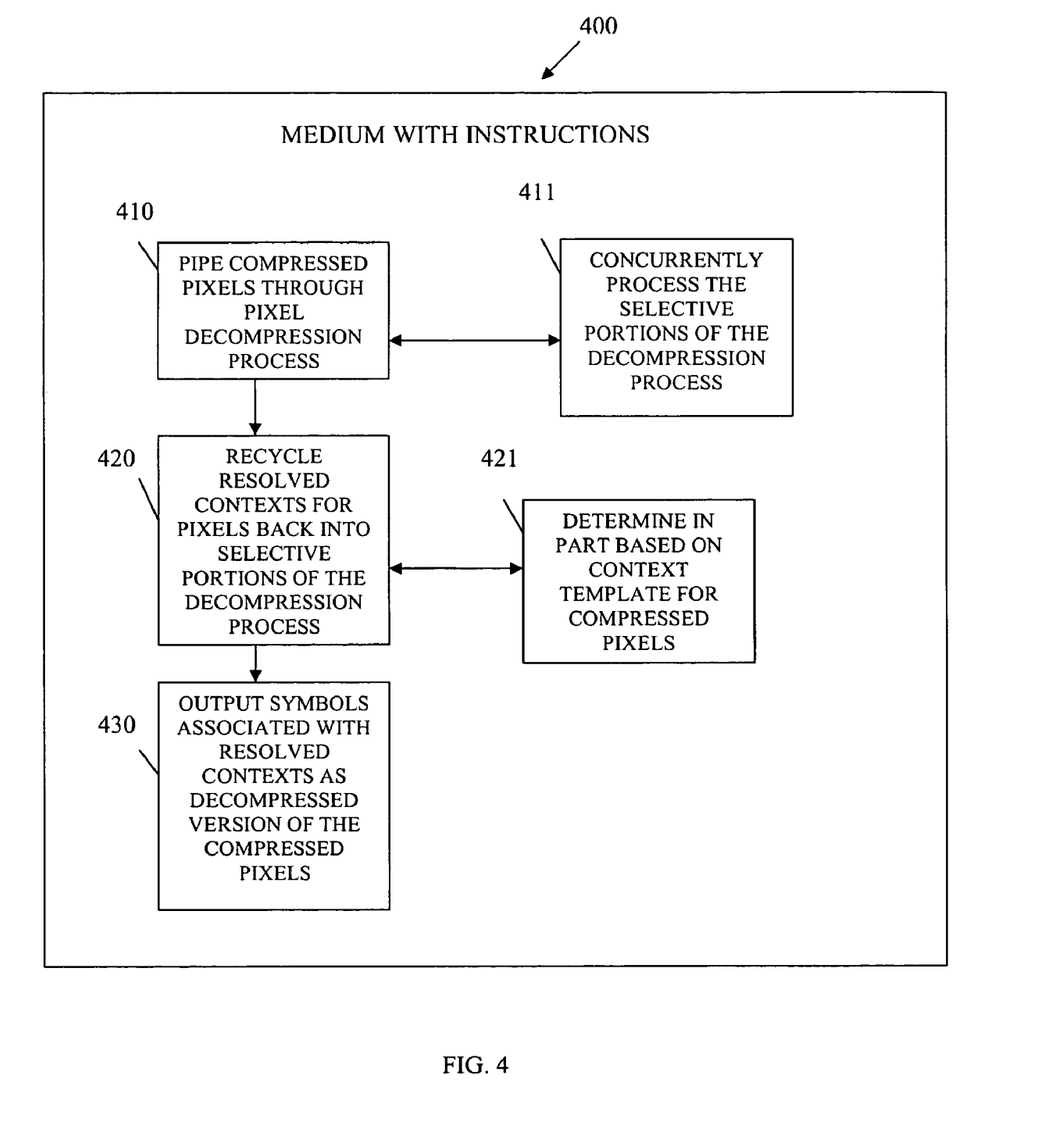
FIG. 4 is a flowchart of a method having instructions in a medium for decompressing compressed pixels of an image, according to an example embodiment.

FIG. 4 shows a flowchart of a method 400 having instructions in a medium for decompressing compressed pixels of an image, according to an example embodiment. The instructions reside in a machine accessible or readable medium. In an embodiment, the instructions reside on removable medium that may be interfaced to a machine, uploaded, and processed on the machine. In another embodiment, the instructions are manufactured into the machine and its hardware. In still another embodiment, the instructions are acquired from remote media over a network (wireless, hardwired, and/or combinations of the same), downloaded to a machine, and processed on the machine. The instructions when processed perform the method 400 depicted in FIG. 4.

At 410, compressed pixels are piped through a pixel decompression process. In an embodiment, the pixel decompression process may include a decoder, a context former, a context state indexer, and a PET. These sub-processes and their processing were described in detail above with methods 100, 200, and 300 of FIGS. 1-3.

The decompression process, at 411, may have selective portions of its process concurrently processed or processed in parallel. Moreover, in an embodiment, a context state indexer and a PET associated with the decompression process may be replicated as two or more duplicate instances of themselves and processed independently and concurrently within the decompression process.

At 420, as the decompression process progresses through the compressed pixels, contexts for some pixels become known or resolved. The resolved contexts are recycled or fed back into selective portions of the decompression process. For example, in an embodiment, resolved contexts for pixels are recycled back to the post processing of the context state indexer and the PET.

In an embodiment, at 421, context may be based in least in part on a context template associated with the compressed pixels. The context template assists in recognizing patterns of pixels in configurable numbers and arrangements against pixels being processed by the decompression process.

At 430, as contexts are resolved for the compressed pixels, symbols associated with the decompressed pixels are outputted as decompressed versions of the compressed pixels.

Figure 5:
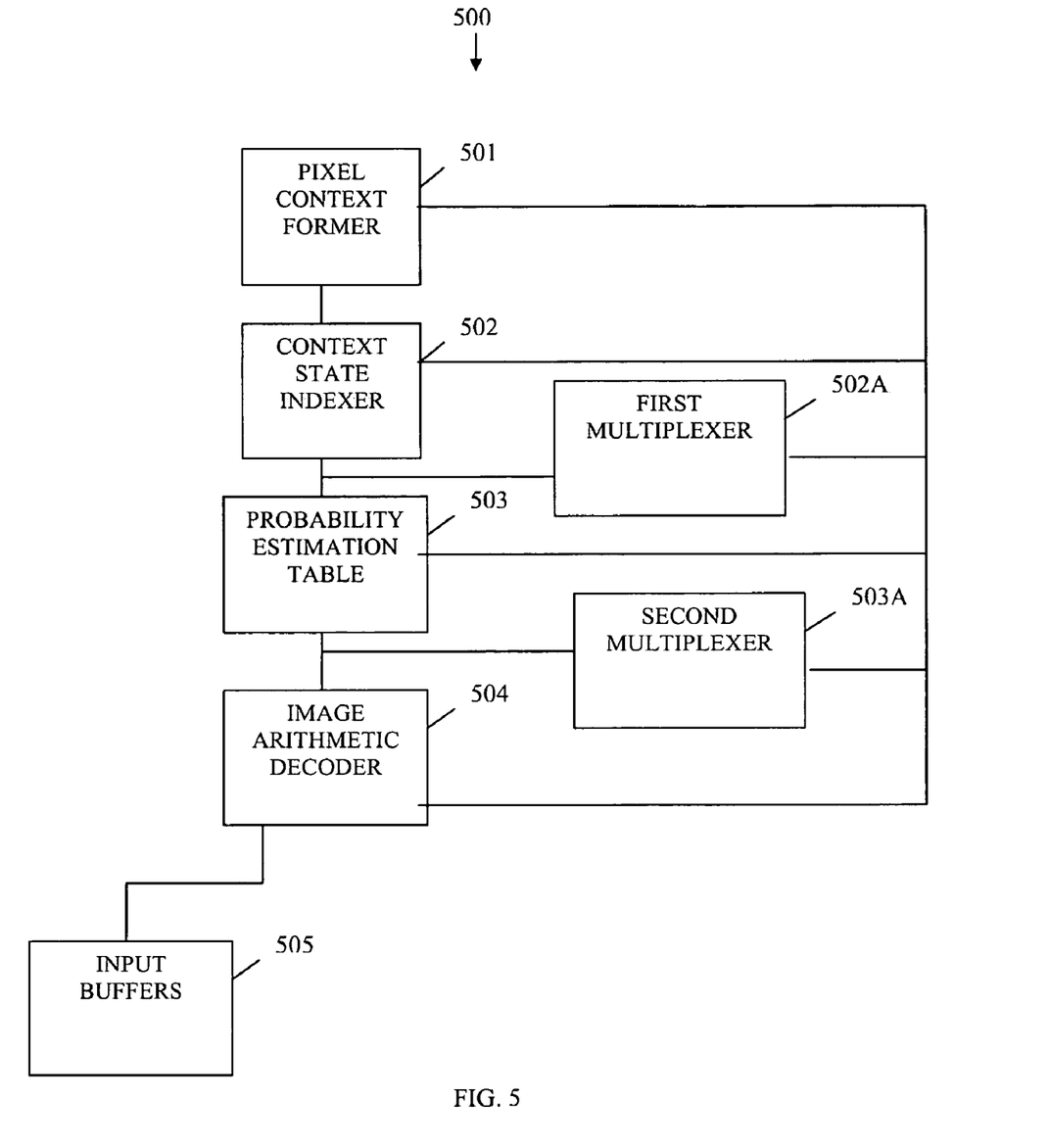
FIG. 5 is a diagram of an image decompression apparatus, according to an example embodiment.

FIG. 5 is a diagram of an image decompression apparatus 500, according to an example embodiment. The image decompression apparatus 500 may be implemented within a machine as a component of the machine. Additionally, the image decompression apparatus 500 may be implemented as software instructions and installed on a portion of a machine.

The image decompression apparatus 500 may include a pixel context former 501, a context state indexer 502, and a probability estimation table 502. The image decompression apparatus 500 may also include an image arithmetic decoder 504. In an embodiment, the image decompression apparatus 500 also may include a first multiplexer 502A and/or a second multiplexer 503A. The arrangement and connections depicted in FIG. 5 is presented for purposes of illustration only, as other and additional connections and/or arrangements are possible without departing from the embodiments presented with the invention.

The pixel context former 501 is adapted to form contexts associated with compressed pixel values supplied to it. In some instances, the pixel context former 501 speculates on contexts for a given pixel based upon its existing state and what is presently known about previously processed pixels and their contexts. During operation of the image decompression apparatus 500, the pixel context former 501 supplies candidate contexts to the context state indexer 502.

The context state indexer 502 maintains an entry for each pixel and its perceived or potential candidate based on dependencies of other pixels that surround a particular pixel being processed. Moreover, the context state indexer 502 is adapted to house with each entry an index into the PET 503 and a sense (symbol) associated with the perceived context. In an embodiment, the context state indexer 502 is adapted to process in parallel with duplicate instances of itself. In this manner, the context state indexer 502 may segmented within a memory device, such that a single memory partition includes a duplicate and replicated version of the context state indexer 502. In another embodiment, the context state indexer 502 may also be split and partitioned into banks within the memory device. During operation of the image decompression apparatus 500, the context state indexer supplies candidate indexes and candidate senses to the PET 503.

The PET 503 is adapted to determine candidate probabilities for a given candidate sense (symbol) based on known contexts for a pixel being decompressed. In an embodiment, the PET 503 may be replicated within memory as multiple and concurrent processing instances of itself; similar to embodiments described with the context state indexer 502. In an embodiment, the PET 503 may be split and partitioned within banks of memory. During operation of the image decompression apparatus 500, the PET 503 supplies a single sense and a probability to an image arithmetic decoder 504 or supplies multiple senses and their associated probabilities to the image arithmetic decoder 504.

The pixel context former 501, the context state indexer 502, and the PET 503 are adapted to process concurrently with one another and against the same or different ones of the compressed pixels. During operation of the image decompression apparatus 500 when a particular context for a particular pixel becomes known or resolved, that resolved context is fed back into the context state indexer 502 and the PET 502 in order to resolve contexts for other pixels that are being processed.

In an embodiment, the resolved contexts are fed back to a first multiplexer 502A and/or a second multiplexer 503A. The multiplexers 502A and 503A reduce the number of candidate indexes produced by the context state indexer 502 and reduce the number of candidate probabilities produced by the PET 503. In this manner, the context state indexer 502 and the PET 503 does not idle waiting on resolved contexts for pixels being processed. The first multiplexer 502A is adapted to receive candidate indexes from the context state indexer 502 and resolved contexts in order to reduce the number of potential indexes supplied to the PET 503. Similarly, the second multiplexer 503A is adapted to receive candidate probabilities for senses from the PET 503 and resolved contexts in order to reduce the number of potential probabilities and senses provided to an image arithmetic decoder 504.

In an embodiment, the image decompression apparatus 500 may include an image arithmetic decoder 504. The image arithmetic decoder 504 is adapted to make decisions that select symbols for a compressed pixel. The PET provides a probability and sense (symbol) to the arithmetic decoder 504. The arithmetic decoder in response to this information selects a proper value for the symbol (0 or 1) and acquires that value, which is then outputted as a decompressed version of the compressed pixel. This in turn resolves a context for that original compressed pixel, which is then fed back to the context former 501, the context state indexer 502, and the PET 503.

In an embodiment, the image decompression apparatus 500 is implemented as a specialized hardware accelerator within a microchip's architecture. In another embodiment, the hardware accelerator is implemented within a programmable processor engine of an image signal processor.

Figure 6:
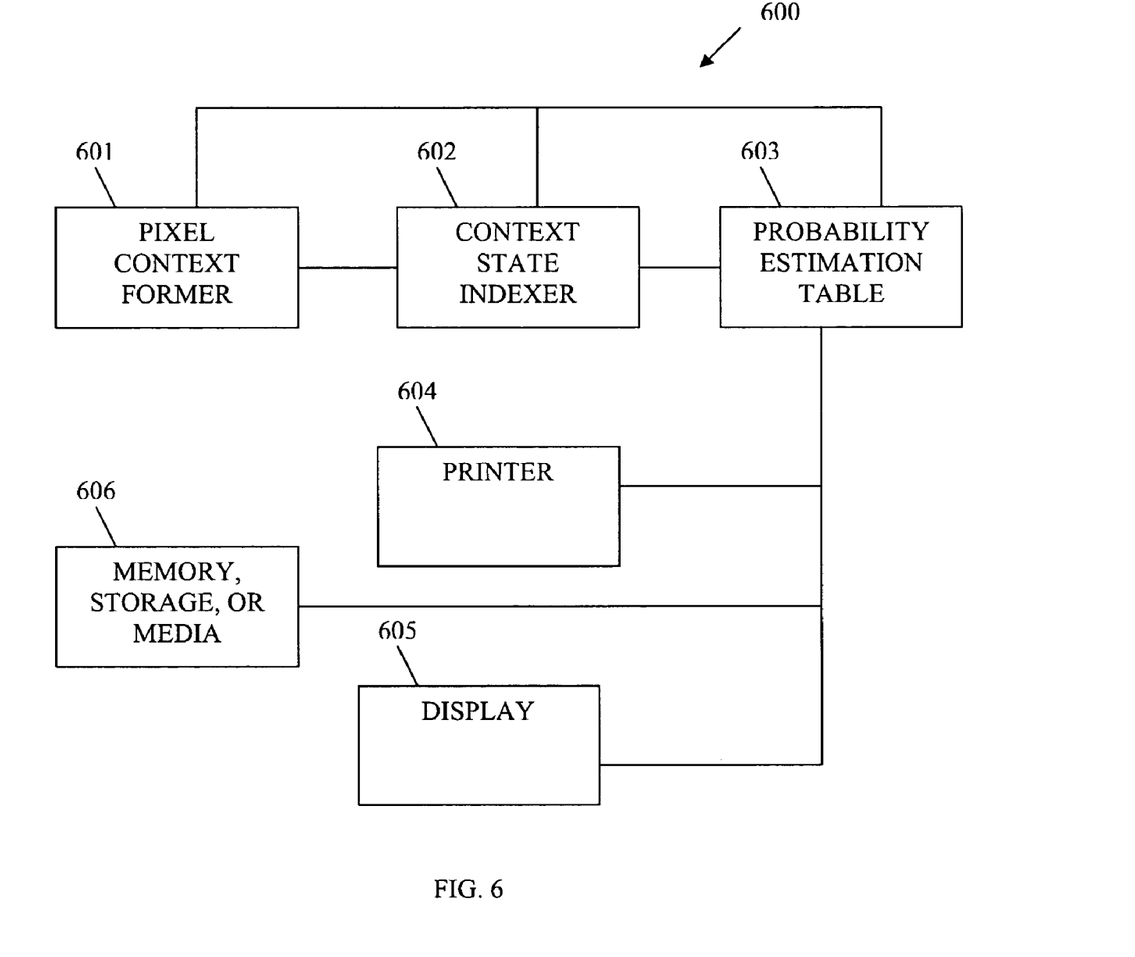
FIG. 6 is a diagram of an image processing system, according to an example embodiment.

FIG. 6 illustrates diagram of an image processing system 600, according to an example embodiment. The image processing system 600 may be implemented with a combination of machines or devices that cooperate with one another. In an embodiment, the image processing system 600 is partially implemented as the image processing apparatus 500 of FIG. 5.

The image processing system 600 includes a pixel context former 601, a context state indexer 602, a probability estimation table (PET) 603, and a printer 604. The adaptations and operations associated with the context state former 601, the context state indexer 602, and the PET 603, were described in detail above with respect to methods 100, 200, 300, and 400 of FIGS. 1-4; and with respect to apparatus 500 of FIG. 5.

The printer 604 is adapted to print decompressed versions of the compressed pixels, which are produced by an image arithmetic decoder interfaced to the pixel context former 601, the context state indexer 602, and the PET 603. That is, the printer 604 is adapted to receive symbols streamed from an arithmetic decoder or from a buffer which accumulates the symbols. The symbols represent a decompression of a compressed image. The printer 604 may spool the symbols for subsequent printing to a print media or may directly print the symbols on the print media. The print media may be any medium capable of being printed to, such as, but not limited to, paper, plastic, metal, glass, cardboard, food, etc.

In an embodiment, the image processing system 600 also includes a display 605 adapted to present the decompressed versions of the compressed pixels as a decompressed image. The display 605 may be integrated into another device or machine or may be a stand alone device or machine. Thus, the display 605 may include, but is not limited to, a printer, a monitor interfaced to a processor, a television, a phone, an appliance, a vehicle, a boat, or an aircraft.

In another embodiment, the image processing system 600 may also include a memory device, a storage device, or media 606. Thus, the decompressed versions of the compressed pixels may be housed in memory, storage, and/or on media 606. For example, a decompressed image may be indexed and stored within a memory location, a storage location (e.g., fixed disk, etc.), and/or on removable storage media (e.g., Compact Disks (CDs), Digital Versatile Disks (DVDs), diskettes, etc.).

The above description is illustrative, and not restrictive. Many other embodiments will be apparent to those of skill in the art upon reviewing the above description. The scope of embodiments of the invention should therefore be determined with reference to the appended claims, along with the full scope of equivalents to which such claims are entitled.

The Abstract is provided to comply with 37 C.F.R. §1.72(b) in order to allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting an intention that the claimed embodiments of the invention have more features than are expressly recited in each claim. Rather, as the following claims reflect, inventive subject matter may lie in less than all features of a single disclosed embodiment. Thus the following claims are hereby incorporated into the Description of the Embodiments, with each claim standing on its own as a separate exemplary embodiment.

What is claimed is:

1. A multi-processor implemented method that executes on a multiprocessor machine, the method comprising:
   (a) piping pixels of a compressed image to a context former, a context state indexer, and a probability estimation table, wherein piping further includes simultaneously providing the pixels as the pixels are obtained to the context former, the context state indexer, and the probability estimation table without buffering the pixels;
   (b) simultaneously supplying decoded versions of the pixels as they become available back to the context state indexer and the probability estimation table, wherein the context former outputs probable contexts for the pixels that are piped back to the context state indexer, the context state indexer maintains an entry for each of possible contexts for the pixels, and wherein each entry includes an index into the probability estimation table and a sense, wherein the sense stores a most probable symbol for a given context as a 0 or a 1, and the probable contexts based on environmental variables and other decoded pixels; and
   (c) iterating (a) and (b) until the compressed image is decompressed.

2. The method of claim 1 further comprising, selecting candidate indexes into the probability estimation table as (b) progresses.

3. The method of claim 1 further comprising, selecting a probability for a symbol associated with each pixel as (b) progresses from the entry in the probability estimation table, wherein the symbol becomes a portion of the decompressed image.

4. The method of claim 1 further comprising, acquiring a context template for the compressed image before (a) is initiated.

5. The method of claim 1 further comprising, processing the method in response to bi-tonal pixels that are a single bit in length.

6. The method of claim 1 further comprising, interfacing the method to a decoder algorithm.

7. A processor-implemented method to execute on a processor, the method comprising:
   receiving a compressed image, via a piping process that does not buffer the image;
   acquiring a context template for the compressed image;
   parsing the compressed image to acquire compressed pixels;
   iterating the compressed pixels to determine each pixel's context in response to the context template and to decompress each pixel, wherein multiple ones of the pixels are processed concurrently and as a particular context for a particular pixel is resolved it is fed back into the processing to assist in resolving contexts for other ones of the pixels, and wherein at each iteration some portions of the processing is working on one pixel while another portion of the processing is working on a different pixel of the compressed image, the template permits resolution of each pixel context for the image once a configurable number of decompressed pixels and their corresponding contexts have been resolved and match to the template, the identity of the template acquired from a header of the compressed image.

8. The method of claim 7 further comprising, identifying a most probable symbol for each of the pixels during the iteration.

9. The method of claim 8 further comprising, outputting each most probable symbol as a decompressed portion of the compressed image.

10. The method of claim 7, wherein iterating further includes piping each pixel through various portions of the processing.

11. The method of claim 7, wherein iterating further includes resolving a current context of a current pixel in response to the particular context fed back into the processing.

12. The method of claim 7, wherein iterating further includes speculating on a number of the contexts based on a pattern of decompression that emerges as the iterating progress through the compressed pixels.

13. The method of claim 7, wherein iterating further includes resolving index values into a probability estimation table during the processing, wherein each index value corresponds to an entry into the probability estimation table that includes a probability for a symbol, and wherein the symbols combine to form a decompressed version of the compressed image.

14. A machine accessible medium having associated instructions, which when executed by one or more processors, results in a machine performing:
   piping compressed pixels though a pixel decompression process, wherein each compressed pixel's decompressed value is dependent upon its context relative to other contexts of other compressed pixels that surround it, and wherein the piped pixels are not buffered and are provided as soon as acquired;
   recycling resolved contexts for the pixels back into selective portions of the pixel decompressing process as they become available; and
   outputting symbols associated with the resolved contexts as decompressed versions of the compressed pixels, wherein each symbol is selected based on a most probable sense having a value of 0 or 1, the 0 or 1 determined with the resolved contexts and the 0 or 1 used to select a particular symbol from a symbol library, each context is resolved based on environmental variables and other decoded decisions for other contexts of decoded pixels.

15. The medium of claim 14, further comprising instructions for determining the resolved contexts, at least in part, in response to a context template associated with the compressed pixels.

16. The medium of claim 14, further comprising instructions for concurrently processing the selective portions of the pixel decompressing process.

17. A machine-implemented apparatus, comprising:
   pixel context former to execute on a processor of the machine and further adapted to form contexts associated with compressed pixels;
   a context state indexer to execute on a processor of the machine and further adapted to resolve one or more indexes into a probability estimation table; and
   the probability estimation table implemented as a component of the machine and adapted to determine probabilities for symbols associated with the compressed pixels;
   wherein the context former, context indexer, and probability estimation table are adapted to process concurrently against same and/or different ones of the compressed pixels that are piped to the context former, the context indexer, and the probability estimation table without buffering the compressed pixels for processing, and wherein as a particular context for a particular pixel becomes available the particular context is fed back to the context state indexer and the probability estimation table to resolve contexts for other pixels, wherein the context former outputs probable contexts for the pixels that are piped back to the context indexer, the context indexer maintains an entry for each of possible contexts for the pixels, and wherein each entry includes an index into the probability estimation table and a sense, wherein the sense stores a most probable symbol for a given context as a 0 or a 1, and each context is formed based on environmental variables and other decoded decisions for decoded pixels.

18. The apparatus of claim 17, wherein the apparatus is implemented as a hardware accelerator within a microchip's architecture.

19. The apparatus of claim 18, wherein the hardware accelerator is implemented within a programmable processor engine of an image signal processor.

20. The apparatus of claim 17 further comprising, an image arithmetic decoder adapted to interface with the context former, the context state indexer, and the probability estimation table.

21. The apparatus of claim 17 further comprising:
a first multiplexer adapted to interface to output produced by the context state indexer and to receive the particular context in order to resolve potential indexes into the probability estimation table; and
a second multiplexer adapted to interface to output produced by the probability estimation table and to receive the particular context in order to resolve a speculative symbol.

22. The apparatus of claim 17, wherein the context state indexer is implemented in memory as two or more independent instances or as a split implementation with multiple banks that correspond to different portions of the memory.

23. The apparatus of claim 22, wherein the probability estimation table is implemented in additional memory as two or more independent instances or as a split implementation with multiple banks that correspond to different portions of the memory.

24. A machine-implemented system, comprising:
pixel context former adapted to form contexts associated with compressed pixels;
a context state indexer adapted to resolve one or more indexes into a probability estimation table;
the probability estimation table adapted to determine probabilities for symbols associated with the compressed pixels, wherein the context former, context indexer, and probability estimation table are adapted to process concurrently against same and/or different ones of the compressed pixels that are piped to the context former, the context indexer, and the probability estimation table without buffering the compressed pixels for processing, and wherein as a particular context for a particular pixel becomes available the particular context is fed back to the context state indexer and the probability estimation table to resolve contexts for other pixels, wherein the context former outputs probable contexts for the pixels that are piped back to the context state indexer, the context state indexer maintains an entry for each of possible contexts for the pixels, and wherein each entry includes an index into the probability estimation table and a sense, wherein the sense stores a most probable symbol for a given context as a 0 or a 1 and each context is formed based on environmental variables and other decoded decisions for decoded pixels; and
a printer adapted to print the decompressed versions of the compressed pixels which are produced as output from an image decoder, which is adapted to interface with the context former, the context state indexer, and the probability estimation table.

* * * * *